Jan. 12, 1943.  S. B. TERRY ET AL  2,308,033
CONTINUOUS THICKNESS GAUGE
Filed July 2, 1941  5 Sheets-Sheet 1

INVENTOR
SPENCER B. TERRY
RAYMOND J. FOX
BY

Jan. 12, 1943. S. B. TERRY ET AL 2,308,033
CONTINUOUS THICKNESS GAUGE
Filed July 2, 1941   5 Sheets-Sheet 3

INVENTOR
SPENCER B. TERRY
RAYMOND S. FOX
BY Joseph N. Schofield

INVENTOR
SPENCER B. TERRY
RAYMOND S. FOX
BY Joseph N. Schofield

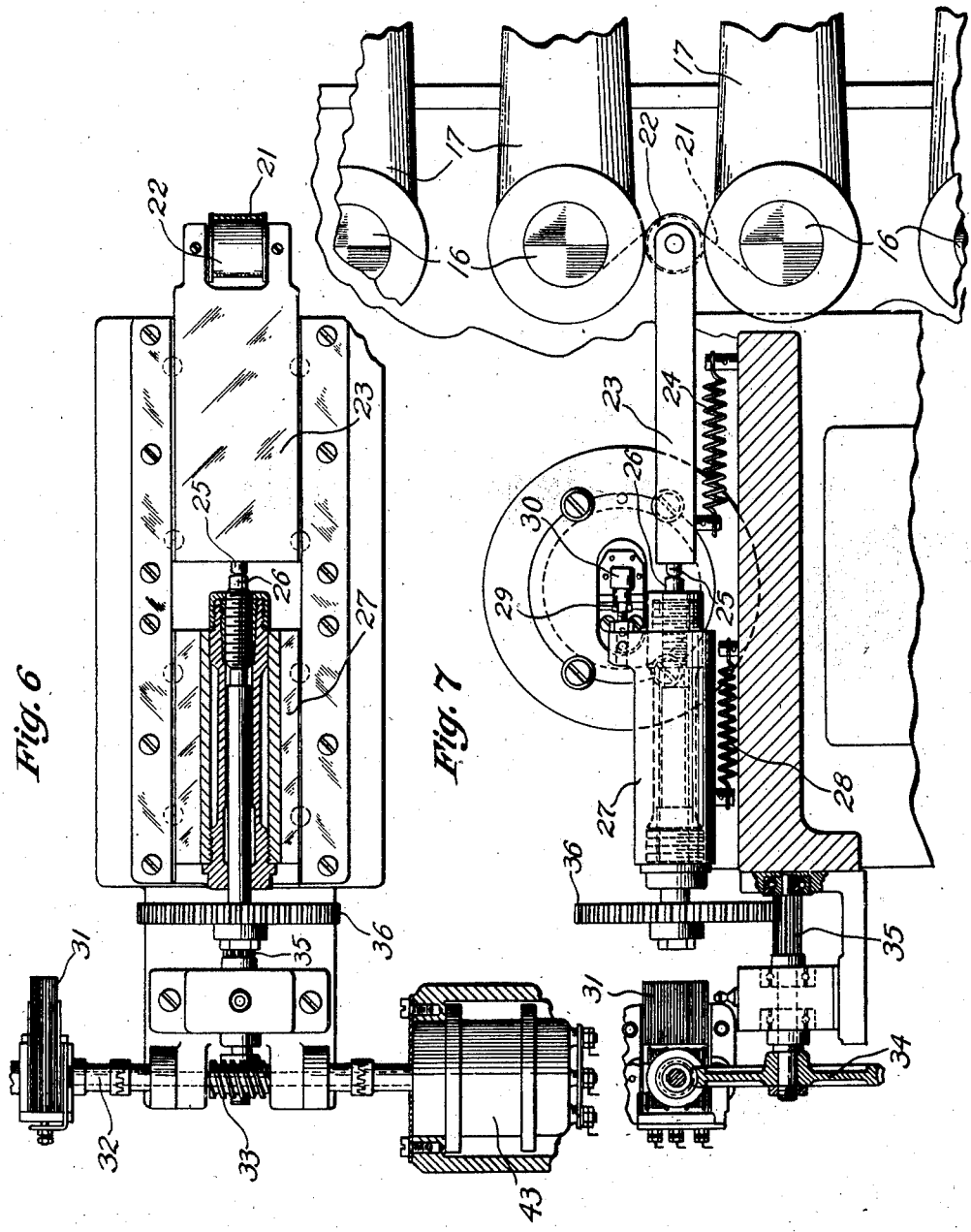

Patented Jan. 12, 1943

2,308,033

UNITED STATES PATENT OFFICE 2,308,033

CONTINUOUS THICKNESS GAUGE

Spencer B. Terry, Washington, D. C., and Raymond S. Fox, West Hartford, Conn., assignors to Niles-Bement-Pond Company, West Hartford, Conn., a corporation of New Jersey Application July 2, 1941, Serial No. 400,748

12 Claims. (Cl. 33—148)

This invention relates to dimension gauges and particularly to a gauge for determining the thickness or gauge of metal strip as it is being rolled and reduced in thickness.

Primarily the present invention relates to dimension gauges adapted to determine the thickness of metal strip at relatively high temperatures immediately after it has passed the rolls of a hot rolling mill.

A primary object of the invention is to provide means to determine the thickness of hot metal strip material while it is being rolled, the gauge operating within extremely close limits and while the material is being advanced through the mill at normal rolling speed.

Another object of the invention is to provide work contacting rollers that may be quickly moved into position against the upper and lower surfaces of the material being gauged and removed therefrom as soon as a reading of the gauge indicator has been taken, the gauge indicating device preferably being in the form of an electric instrument having a pointer movable over a graduated dial, the instrument being placed at a convenient distance from the rolling mill.

Another object of the invention is to provide adjusting or setting means for a micrometer screw to adjust the gauge for gauging strip material of widely different thicknesses, these setting means being operated from a convenient control station at a distance from the gauge structure and from the mill.

Another object of the invention is to provide an indicator in the form of a counter located at a convenient distance from the gauge to indicate the thickness of material for which the gauge is adjusted, the indicator or counter being connected electrically by self-synchronizing mechanism to the gauge adjusting mechanism so that the adjustment of the gauge may be visually indicated at all times.

Another object is to provide a flexible member wrapped partially around shafts supporting the arms on which are mounted the contacting rollers, the intermediate portions of the flexible member bearing against a member slidably mounted within the gauge housing. This member bears against a second slidable member within which is supported a micrometer screw so that the position of this second slidable member within the housing will be varied by movements of the arms and serve to vary the position of the armature of an Electrolimit gauge, thereby indicating the separation of the gauging rollers and the thickness of the strip being gauged.

And finally it is an object to provide circulating passages for a liquid coolant through the material contacting rolls, their supporting arms and adjacent portions of the gauge.

With the above and other objects in view the invention includes the features of construction and operation set forth in the following specification and illustrated in the accompanying drawings.

In the accompanying drawings annexed hereto and forming a part of this specification, we have shown the invention embodied in an electric type gauge known as an Electrolimit gauge applied directly to a metal strip rolling mill, but it will be understood that the invention can be otherwise embodied and that the drawings are not to be construed as defining or limiting the scope of the invention, the claims appended to this specification being relied upon for that purpose.

In the above mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a housing preferably movable laterally upon suitable guideways into and out of operative position relative to a strip or other movable material, a dimension of which is to be gauged or measured; second, contacting rollers for the material being gauged suitably mounted at one end of the housing for movement into and out of contact respectively with the upper and lower surfaces of the material being gauged; third, arms pivotally mounted on shafts within the housing for supporting the contacting rollers for movements toward and from each other while maintaining their axes at all times parallel to each other; fourth, a thin flexible metal strip or band connected at its ends to the shafts supporting the roller carrying arms and wrapped partially there-around so that movements of the rollers toward and from each other and oscillation of their arms varies the disposition of said flexible band; fifth, a spring pressed member within the housing having a roller bearing against an intermediate part of said flexible band; sixth, a second slidable member in said housing rotatably mounting a micrometer screw, the end of the micrometer screw bearing against the end of the first sliding member; seventh, adjusting means for the micrometer screw preferably operated by a small motor; eighth, a generator of a self-synchronizing unit rotatable with said screw adjusting means; ninth, a self-synchronizing motor electrically connected to said synchronizing unit generator and operating a counter or indicator to indicate the thickness for which said micrometer screw and rollers are adjusted; tenth, an armature lever pivotally mounted within the housing and contacted at one end by an abutment on the second sliding member supporting said micrometer screw; eleventh, electric circuits controlled by varying positions of said armature between induction coils in said circuits disposed adjacent the end and on opposite sides of said armature; twelfth, an electric indicating instrument in said circuit to indicate the position of the armature and the variation in thickness of the material being gauged from the particular dimension for which the micrometer screw and contacting rollers are adjusted; and thirteenth, liquid circulating passages extending through the rollers, their supporting arms and adjacent portions of said gauge.

Figure 1:
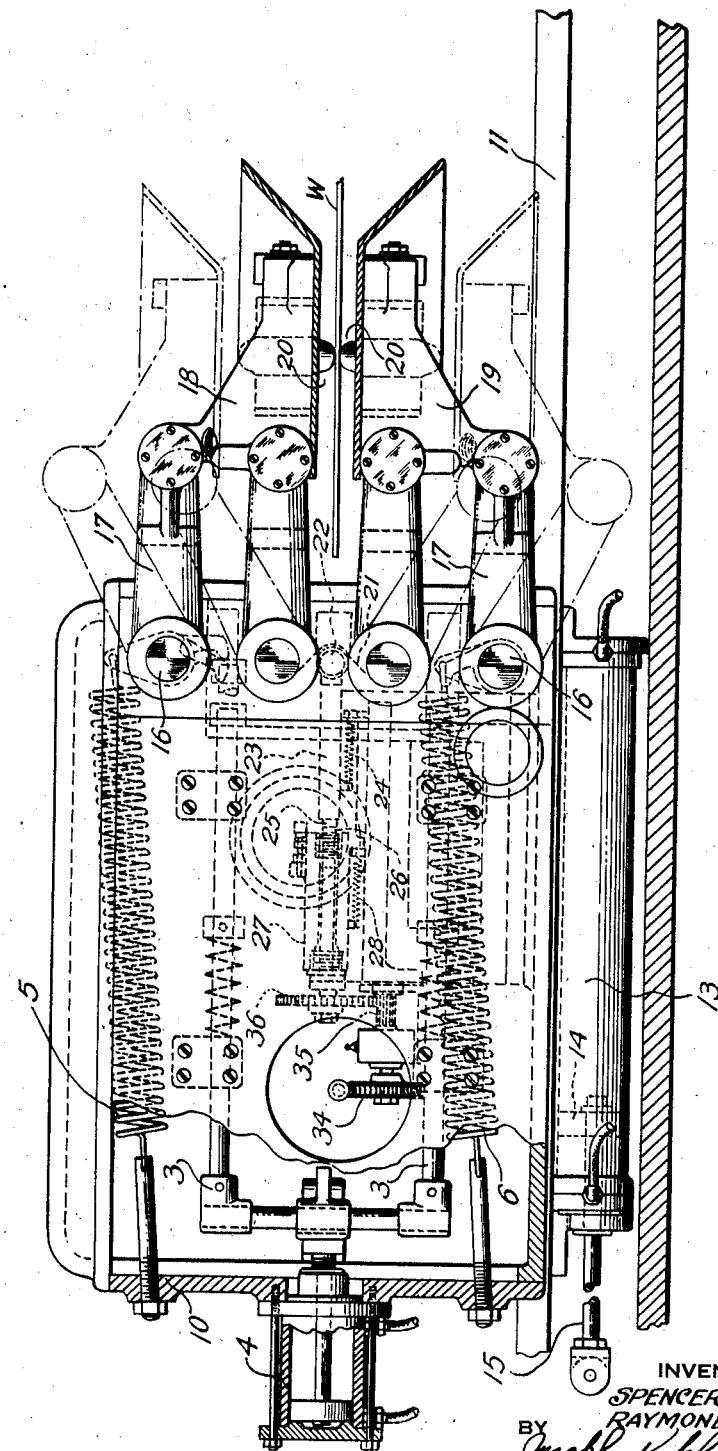
Figure 1 is a side elevation, partly in section, of a complete gauge made in accordance with the present invention.

Referring more in detail to the figures of the drawings it will be seen that the gauge assembly comprises a housing 10 mounted for lateral movement upon suitable rails 11, there being spaced rollers 12 positioned at the outer and lower portions of the housing for engagement with these rails. To advance the housing 10 into position relative to the strip W being gauged a cylinder 13 may be secured in position on a surface of the housing 10 to which air may be admitted at its opposite ends by any suitable manually controlled means not shown. Within the cylinder 13 is a piston 14 having a piston rod 15 extending from one end of the cylinder and secured in fixed position to a suitable support (not shown) at its outer end. By admitting air or other fluid to one end of the cylinder 13 the housing 10 and gauging members mounted thereon may be retracted to an inoperative position away from the strip W and by admitting air to the opposite end of the cylinder the housing may be advanced to a position as shown in Fig. 1 so that its gauging members will be positioned to engage upper and lower surfaces of the strip being gauged.

Mounted parallel to each other and spaced vertically above one another near one end of the housing 10 are four transversely extending shafts 16 to each of which is attached an arm or frame 17 of a parallel motion linkage. The outer or free ends of the upper and lower pairs of these arms or frames 17 are pivotally attached respectively to an upper and lower gauging head 18 and 19 within each of which is mounted a gauging roller 20. The two upper shafts 16 support the gauging head 18 having a roller 20 adapted to engage the upper surface of the strip W being gauged and the two lower shafts 16 support the gauging head 19 supporting a roller 20 engaging the lower surface of the strip W in a position directly opposed to the upper gauging roller. It will be seen by an inspection of Figs. 1 and 4 that in any position of the arms or frames 17 the gauging rollers 20 within the gauging heads 18 and 19 will be disposed parallel to each other and with their axes parallel to the strip being gauged.

Figure 4:
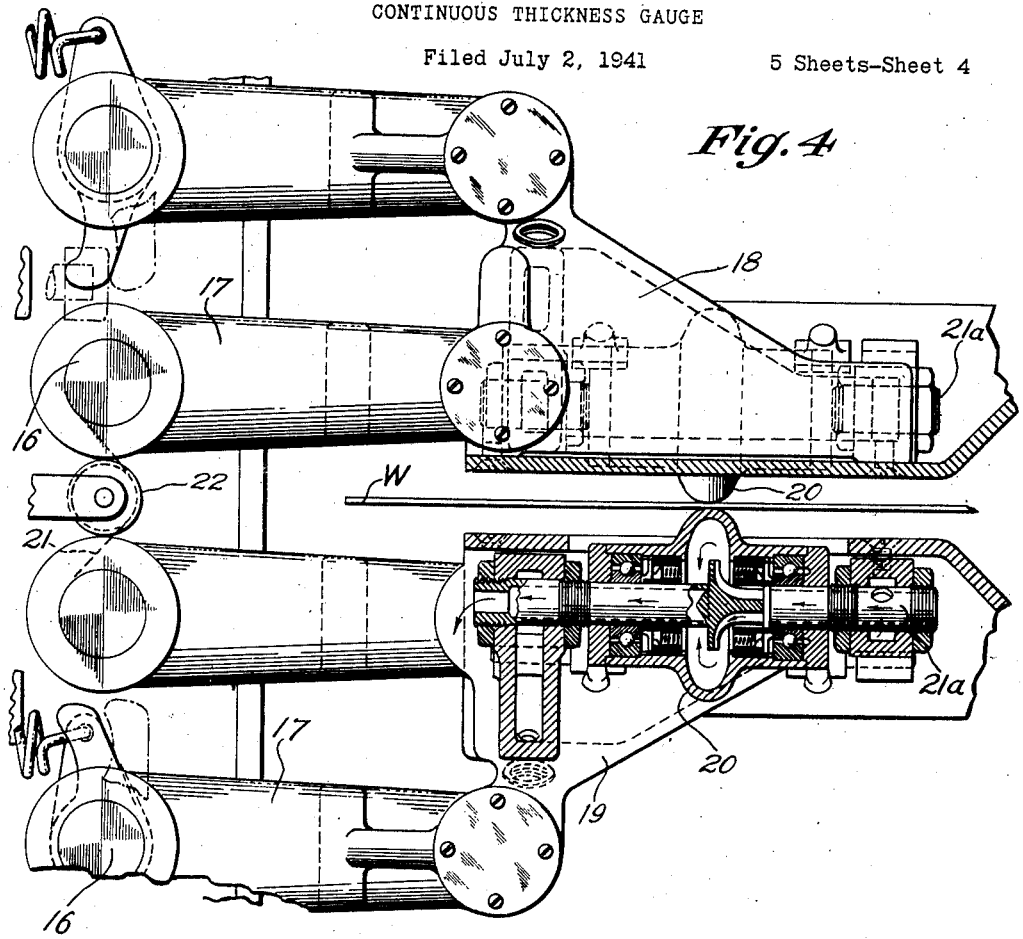
Fig. 4 is an enlarged side elevation, partly in section, of the gauging rollers and their mounting means, the passages through the gauging rollers for a cooling liquid being also shown.
Figure 5:
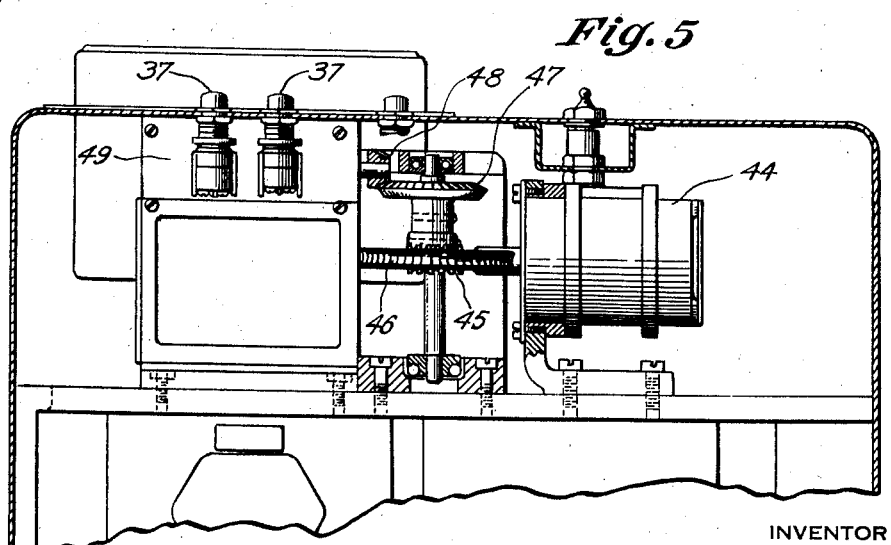
Fig. 5 is a plan view, partly in section, of the indicating and setting mechanism shown in Fig. 3, and Figs. 6 and 7, respectively, are plan and side elevations respectively of the dimension setting means for the strip contacting rollers.

The gauging rollers 20, as best seen in Fig. 4, are hollow and are mounted for free rotation upon fixed hollow shafts 21 supported respectively within the upper and lower gauging heads 18 and 19, there preferably being anti-friction bearings mounted on the shafts 21 adjacent the ends of the rollers 20 to rotatably support them upon their axes.

Figure 2:
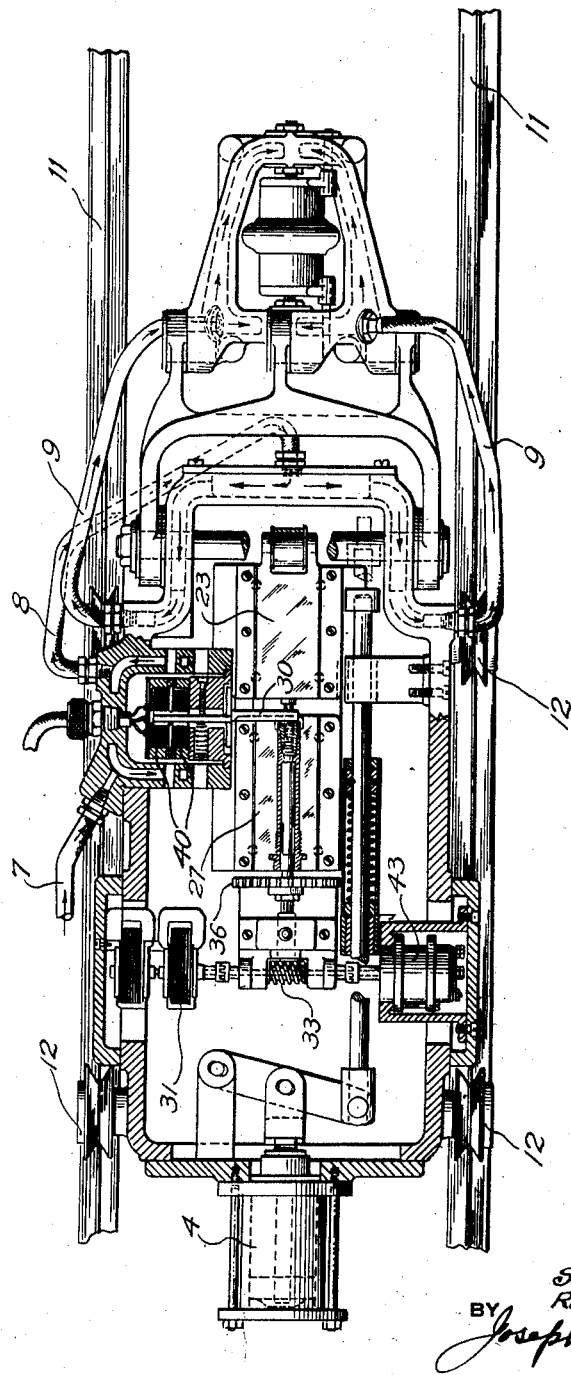
Fig. 2 is a plan view of the mechanism shown in Fig. 1, parts being shown in section to more clearly indicate their construction.
Figure 3:
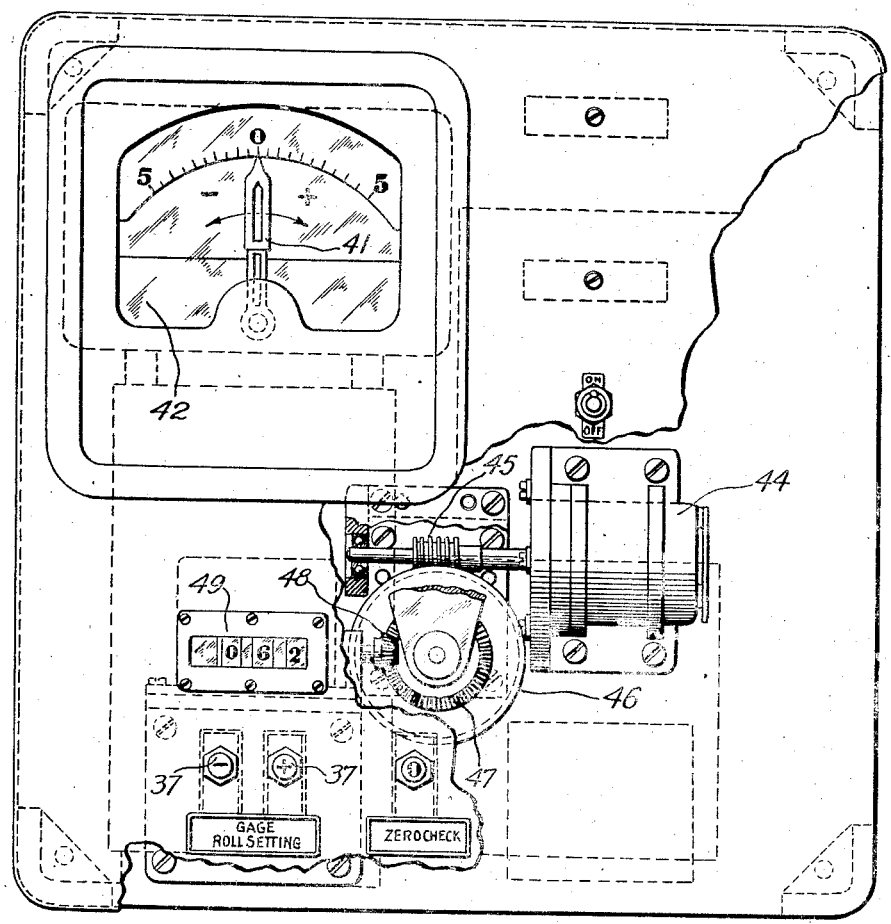
Fig. 3 is a front elevation of the indicating and setting means for the gauge, parts being broken away to more clearly show their construction.

Also as seen in Figs. 2 and 4, passages for a cooling liquid are provided within portions of the housing, the gauging roller supporting heads 18 and 19 and the rollers 20 for preventing the temperature of these parts becoming sufficiently high to adversely affect the precision of the gauge. For this purpose fluid may be admitted through suitable conduits 7 and 8 to the forward end of the housing 10 which may be suitably recessed or chambered for cooling water. From opposite sides of the housing 10, by means of suitable flexible conduits 9, the cooling fluid may be admitted to the upper and lower gauging head members 18 and 19 which are hollowed or recessed for that purpose. From channels within these gauging heads cooling water may enter one end of the gauging roller supporting shaft 21ᵃ and pass through the hollow gauging roller 20, there being deflectors adapted to force the liquid outwardly toward the periphery of the roller, and there being seals to prevent the liquid from entering the bearings. From the rollers 20 the liquid may pass through the supporting shafts 21ᵃ, one of which is shown in section, and outwardly from one end thereof to be collected in a drain or other receptacle (not shown). In any position of the arms 17 and the gauging heads 18 and 19 a continuous flow of cooling fluid is provided through the heads and rollers.

Referring to Figs. 1, 2 and 4, it will be seen that means are provided to normally urge the gauging heads 18 and 19 and their rollers 20 toward each other and into contact with the strip W being gauged with a light pressure, long helical springs being provided within the housing 10 for that purpose. A spring 6 attached at one end to a short arm mounted on the lowermost shaft 16 forces the lower gauging head 19 and its roller upward into gauging position. The opposite end of the spring 6 is attached to a threaded rod extending through the wall of the housing 10 so that the pressure of the spring 6 to raise the head 19 and hold it in position against the strip being gauged may be varied. As shown most clearly in Fig. 1, the uppermost shaft 16 also is provided with a short arm to which one end of a helical spring 5 is attached. The opposite end of this spring may be attached to a threaded rod or bar similar to that for the spring 6 supporting the head 19, adjustment of which varies the pressure and relieves a portion of the weight of the upper head 18 and roller 20 upon the strip. By means of these springs 5 and 6 the rollers 20 within heads 18 and 19 are normally urged toward their operative or gauging positions.

To move the heads 18 and 19 and their rollers 20 away from the strip W a cylinder 4 may be mounted upon the rear surface of the housing 10 having a piston therein which when forced to its forward position will move a frame member 3 toward the right as seen in Fig. 1. Movement of this member 3 in this direction will abut the ends of rods forming parts of the member against small arms outstanding from the upper and lower shafts 16 and slightly rotate the shafts and force the arms 17 in directions to widely separate the gauging rollers 20. Movement of the piston 4 in the opposite direction will permit the gauging rollers 20 to move under the pressure of springs 5 and 6 into contact respectively the upper and lower surfaces of the strip being gauged.

To determine the position of and to vary the adjustment of the rollers 20 for different thicknesses of strip the following mechanism may be provided. To the intermediate shafts 16 supporting the gauging heads 18 and 19 and rollers 20 there is attached a flexible strip of non-stretchable material 21 such as a strip of thin metal. With varying adjustments of the rollers 20 the shafts 16 to which the ends of the strip 21 are attached will be oscillated to different angular positions so that the flexible strip will flex to different positions. Bearing against the strip 21 is a roller provided at one end of a slidably mounted member 23 within the housing 10. A spring 24 shown in Fig. 7 forces the slidable member 23 as far to the right (as seen in Fig. 7) as permitted by the separation of the rollers 20 and consequent rotative position of the shafts 16. The position of this sliding member 23 will vary with varying thicknesses of strip W being gauged and when the rollers 20 are moved to their inoperative position the sliding member 23 will be moved to its extreme position to the right.

Bearing against an abutment 25 formed on the end of the sliding member 23 opposite its roller 22 is the forward end of a micrometer screw 26. This screw 26 is rotatably mounted within a second slidable member 27 in alignment with the first slidable member 23. A spring 28 forces this member 27 toward the right and in contact with the first slidable member 23. On the second slidable member 27 is an abutment 29 in the form of an adjustable screw contacting the end of a lever 30 forming an armature disposed between the opposed induction coils (see Fig. 2) of a standard Electrolimit gauge, the operation of which will presently be described. With the rollers 20 engaging the strip W variations in thickness of the strip will vary the positions of the slides 23 and 27. These movements of slide 27 will vary the angular position of the armature or lever 30 and thus vary the induced voltages in the coils 40 of the Electrolimit gauge circuit. For any nominal thickness of the strip W the micrometer 26 is adjusted by rotation of its screw to correspond to the nominal thickness. Variations in thickness of the strip W will therefore be indicated by movements of the indicator of the electrical instrument corresponding to movements of the armature 30 between coils 40.

To adjust the position of the micrometer screw 26 motor 31 is provided drivingly connected to a shaft 32 having a worm 33 thereon. To rotate the motor 31 in either direction push button switches 37 operable manually are provided on an instrument panel board mounted at a convenient distance from the gauge. This worm 33 meshes with a worm wheel 34 on a shaft having an elongated pinion 35 engaging a large gear 36 mounted on the end of the micrometer spindle 26. By rotating the motor 31 in either direction the micrometer spindle 26 or screw may have its position varied. The pinion 35 is sufficiently elongated so that in any position of the slide 27 the gear 36 will be engaged. As shown in Figs. 2, 6 and 7 the motor 31 and shaft 32 as well as the shaft on which the gear 34 and pinion 35 are mounted are mounted in fixed positions within the housing 10.

Referring to Fig. 2 it will be seen that the lever 30 is mounted for slight pivotal movement about an intermediate point and that movements of the lever by slight movements of the slide 27 will vary the position of its opposite end between induction coils 40. These coils are a part of an electric circuit similar to that shown and described in the patent to Terry 2,137,368 granted November 22, 1938. Variations in the position of the armature 30 due to slight variations in the positions of the rollers 20 from a predetermined setting varies the position of the pointer 41 of the indicating instrument 42 from its central or zero position. As this pointer 41 is in every respect similar to and operates in the same manner as in the indicating instrument shown in the above-referred to patent, further description will be unnecessary.

To indicate the adjustment, that is, the nominal strip thickness for which the rollers 20 and the micrometer screw 26 are set, the following mechanism is provided. On the shaft 32 rotation of which effects the rotation of the micrometer screw 26 to position the rollers 20 for predetermined thicknesses of material being rolled is the generator 43 of a self-synchronizing motor generator set. This generator 43 is rotated in accordance with the rotation of the micrometer spindle or screw 26. Coupled electrically to this generator 43 is a self synchronizing motor 44. As the circuits connecting this generator and its motor for synchronized operation are conventional they have not been shown. It will be understood that rotation of the rotor of the generator 43 will correspondingly rotate the rotor of the motor 44.

Driven by the motor rotor 44 is a worm 45 on the motor shaft which is in mesh with a large gear 46 having a bevel gear 47 rotatable therewith at one side. This bevel gear 47 meshes with a small bevel 48 on the end of a counter 49. The gear ratio between the motor 44 and the shaft of the counter 49 is such that the digits of the counter will correspond to the thickness in thousandths of an inch for which the micrometer screw 26 is adjusted.

To initially adjust the mechanism the rollers 20 are placed in contact with each other and the screw 26 of the micrometer is adjusted to zero. The movable abutment 29 is then adjusted so that the indicator 41 of the electrical instrument 42 stands at the central zero of its graduated scale.

In operation when it is desired to take a reading of the thickness of the strip being rolled the arms 17 are allowed to oscillate to move the rollers 20 into contact with the surfaces of the strip by admitting fluid under pressure to the cylinder 4 to force the piston therein and rods connected thereto toward the left as seen in Fig. 1. The forward ends of these rods normally contact short arms on two of the shafts 16, and hold the arms 17 and rollers in their retracted or inoperative positions. As soon, however, as pressure is released from the front of the piston in cylinder 4 springs 5 and 6 move the rollers 20 into gauging contact with the strip W. Slide 23 is moved to the left by means of the flexible metal strip 21 which in turn forces the micrometer screw 26 and slide 27 toward the left. Previously the micrometer screw 26 has been adjusted within its slide 27 to indicate the nominal thickness of the strip W being gauged so that the movement to the left of slide 27 when the rollers 20 are moved into contact with the strip being gauged will move abutment 29 into contact with the armature lever 30 and will move the armature lever by an amount determined by the amount the strip is over or under its correct or nominal thickness. This movement of the lever 30 will vary the voltages induced in coils 40 and will correspondingly move the pointer 41 over its scale.

What we claim is:

1. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, a slidable member moved by flexing of said strip, and an indicating device operated by movements of said slidable member to determine variations in the distance apart of said contacting rollers.

2. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, a slidable member moved by flexing of said strip, a second slidable member adjustably spaced from said first slidable member, and an indicating device operated by movements of said second slidable member to determine variations in the distance apart of said contacting rollers.

3. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, a slidable member moved by flexing of said strip, a second slidable member adjustably spaced from said first slidable member, means to indicate the adjustment of said second slidable member relative to the first slidable member, and an indicating device operated by movements of said second slidable member to determine variations in the distance apart of said contacting rollers.

4. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, a slidable member moved by flexing of said strip, a second slidable member spaced from said first slidable member, a micrometer spindle housed within one of said members for adjustably spacing said slidable members one from the other, and an indicating device operated by movements of said second slidable member to determine variations in the distance apart of said contacting rollers.

5. A continuous gauge comprising in combination, a gauge housing mounted for movement into and out of gauging position, pivotally supported arms outstanding therefrom, shafts for supporting said arms, work contacting rollers mounted on said arms for movement toward and from the surfaces of said work with pivotal movements of said arms, coolant circulating means within said arms and rollers, a flexible strip having its opposite ends attached around a pivotal supporting shaft for each of said arms, a slidable member moved by flexing of said strip, a second slidable member adjustably spaced from said first slidable member, and an indicating device operated by movements of said second slidable member to determine variations in the distance apart of said contacting rollers.

6. A continuous gauge comprising in combination, a gauge housing mounted for movement into and out of gauging position, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, a slidable member moved by flexing of said strip, a second slidable member adjustably spaced from said first slidable member, telemetric means to indicate the adjustment of said second slidable member from said first slidable member, and telemetric indicating means controlled by combined movements of said first and second slidable members with flexing of said strip to determine variations in the distance apart of said contacting rollers.

7. A continuous gauge comprising in combination, a gauge housing mounted for movement into and out of gauging position, pivotally supported arms outstanding therefrom, shafts for supporting said arms, members attached to the outer ends of said arms for movement toward and from each other while maintained in parallel positions and having work contacting rollers mounted therein, a flexible strip attached at its opposite ends respectively to pivotal supporting shafts for said arms, a gauging device operated by angular movements of said supporting shafts and flexing of said strip to determine variations in the distance apart of said rollers, and telemetric adjusting and indicating means for said gauging device.

8. A continuous gauge comprising in combination, members contacting opposite surfaces of the strip being gauged, a parallel linkage device supporting said members for direct movements toward and from each other, a flexible member having its ends mounted on said supporting devices for said contacting members whereby movements of said contacting members flex said flexible member, a roller engaging the central portion of said flexible member, a slidable member on which said roller is mounted, a second slidable member adjacent said first slidable member, means to position said second slide for predetermined distances apart of said contacting members, and electric indicating means having an armature engaging said second slidable member to determine variations of said contacting members from any predetermined position.

9. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, and an indicating device operated by angular movements of said supporting shafts and the resulting flexing of said strip to determine variations in the distance apart of said contacting rollers.

10. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, means to actuate said arms to move said rollers into and out of contact with said work surfaces, a flexible strip having its opposite ends attached around a pivotal supporting shaft for each of said arms, and an indicating device operated by angular movements of said supporting shafts and the resulting flexing of said strip to determine variations in the distance apart of said contacting rollers.

11. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, a flexible strip having its opposite ends attached around a pivotal supporting shaft for each of said arms, an indicating device operated by angular movements of said supporting shafts and the resulting flexing of said strip to determine variations in the distance apart of said contacting rollers, and means to adjust said device for a predetermined distance apart.

12. A continuous gauge comprising in combination, a gauge housing, pivotally supported arms outstanding therefrom, shafts for supporting said arms, work contacting rollers mounted on said arms for movement toward and from the surfaces of said work with swinging movements of said arms, means normally retaining said arms in an inoperative position and means effecting movement of said arms in directions to contact said rollers with said work, a flexible strip having its opposite ends attached around a pivotal supporting shaft for each of said arms, and an indicating device operated by angular movements of said supports and the resulting flexing of said strip to determine variations in the distance apart of said contacting rollers.

SPENCER B. TERRY.
RAYMOND S. FOX.